United States Patent [19]

Redington

[11] Patent Number: 4,648,854

[45] Date of Patent: Mar. 10, 1987

[54] VARIABLE SPEED DRIVE

[75] Inventor: Gordon F. Redington, St. Paul, Minn.

[73] Assignee: SnyderGeneral Corporation, Minneapolis, Minn.

[21] Appl. No.: 684,679

[22] Filed: Dec. 21, 1984

[51] Int. Cl.<sup>4</sup> ............................................. F16H 7/14
[52] U.S. Cl. .................................................. 474/114
[58] Field of Search ................................. 474/26, 114

[56] References Cited

U.S. PATENT DOCUMENTS

| | | | |
|---|---|---|---|
| 1,528,346 | 3/1925 | Stampen | 474/114 X |
| 2,001,111 | 5/1935 | Rhodes et al. | 474/114 X |
| 2,796,091 | 6/1957 | Odlum et al. | 474/114 X |
| 4,378,199 | 3/1983 | Hesler | 474/26 X |
| 4,381,174 | 4/1983 | Obler | 474/26 X |

*Primary Examiner*—James A. Leppink
*Assistant Examiner*—Frank H. McKenzie, Jr.
*Attorney, Agent, or Firm*—Richards, Harris, Medlock & Andrews

[57] ABSTRACT

A variable speed drive of the type having a fixed pulley, a variable pulley mounted on a motor shaft and a drive belt coupling the two pulleys. The motor is pivotally mounted on a frame. An actuator is provided for pivoting the motor and variable pulley through an arc to vary the distance between the pulleys which changes the pitch diameter of the variable pulley and the drive ratio of the system. The variable pulley has one fixed face and one movable face, and a cam system is provided and positioned for engagement upon arcuate movement of the motor to cause a predetermined amount of lateral movement of the motor and variable pulley to compensate for changes in the drive line of the variable pulley to movement of the movable face thereof. In this manner, the cam system maintains the variable pulley, fixed pulley and drive belt in accurate alignment throughout the entire range of movement of the motor and corresponding range of variation in the drive ratio of the system.

1 Claim, 8 Drawing Figures

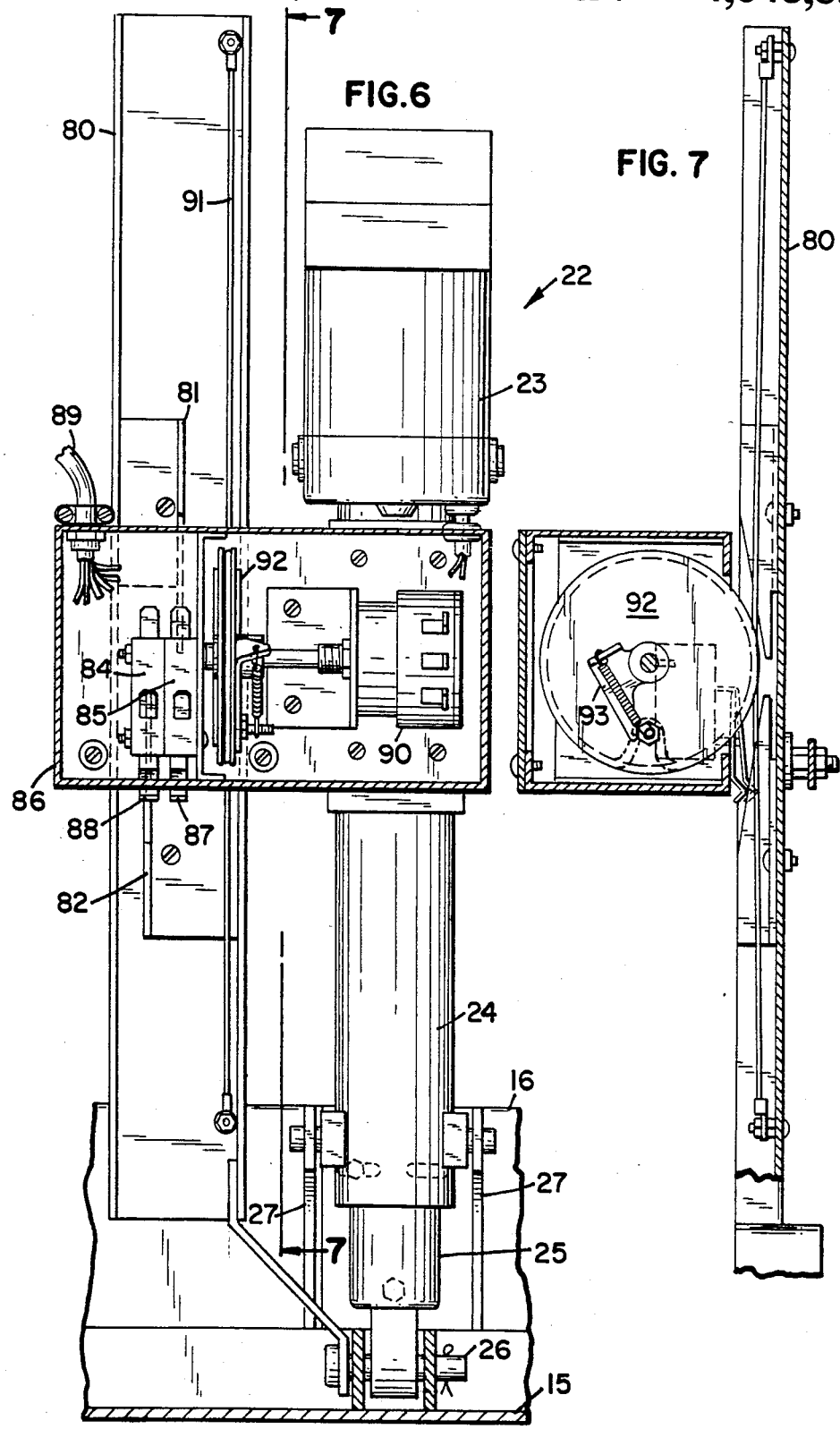

VARIABLE SPEED DRIVE

TECHNICAL FIELD

This invention pertains to variable speed drives, which for example might be used in airflow controllers for air conditioning systems, and particularly to an improved variable speed drive for a fan or blower for use in such systems.

BACKGROUND OF THE INVENTION

Many air conditioning systems used in larger commercial buildings use control of airflow in various ducts as a means for controlling the air conditioning, i.e. heating, cooling or ventilation, in various rooms or spaces of the building. One desirable way of controlling airflow is through the use of fans or blowers having a variable flow rate. Some such fans use controllable dampers or vanes either on the outlet of the blower or on the air inlet thereto, as a means for controlling the airflow volume of the blower. However, such techniques are relatively inefficient in that the damper or other control device causes a considerable loss of energy. A preferable technique is to control the speed of the blower itself, and a number of prior art techniques have been proposed for that purpose.

Variable pulley drive systems have been used for variable speed drives to blowers. In such systems an electric motor drives a fan or blower through a variable pulley system. Such variable pulley systems generally have a variable pulley or sheave and a fixed pulley or sheave with a V-belt coupling them. The variable sheave has one or both of its faces moveable so that the drive belt may ride lower or higher in the pulley depending on the spacing between the movable faces, thus changing the effective pitch diameter of the pulley and the drive ratio system. Control of the drive ratio is accomplished by an actuator which varies the distance between the pulleys which, in conjunction with the spring loaded variable pulley, controls the depth that the V-belt rides in the pulley and thus its driving ratio.

One type of prior art variable speed drive as shown in U.S. Pat. No. 4,378,199 uses a variable sheave on a motor shaft coupled to a fixed sheave which in turn is coupled to drive the fan. The motor is mounted on a platform which slides toward and away from the fixed sheave, under control of a worm gear or other actuator. Although such systems do work to control drive ratio and hence speed of the fan, they are subject to certain disadvantages in that the horizontal slide for the motor can bind or stick, resulting in faulty operation. A typical large drive motor may weigh some 300 pounds. In addition, it is not uncommon that there would be a 100-pound force applied through the drive belt, which is off center with respect to the slidable frame, and these factors can lead to binding of the sliding carriage.

Another type of prior art device as shown in U.S. Pat. No. 4,381,174, uses a drive motor with a variable sheave on the motor, wherein the motor is mounted on a frame that can pivot the motor through an arc in a manner that varies the distance between the pulleys. Such a pivoting technique overcomes the problems of binding in the sliding system discussed above, but it too is subject to certain disadvantages. Because alignment of the two pulleys is critical in order to avoid excessive wear of the drive belt, such prior art designs should use a two-sided movable sheave pulley, i.e. one in which both sides move inwardly or outwardly as the case may be, to change the effective drive diameter without affecting the lateral position and hence alignment of the drive belt. However, if one side of the movable sheave pulley sticks or does not move as freely as the other, upon the changing of the distance between the pulleys to change drive ratio, there can be a net lateral shifting of the drive belt at the motor end. Since these drive belts are engaged firmly along their sides, and since the drive force is considerable, even a slight altering of alignment drastically increase the wear on the belt which can cause premature failure. This in turn increases cost, not only for the maintenance work required but the considerable cost of the belt itself.

SUMMARY OF THE INVENTION

This invention provides an improved variable speed blower drive of the type using a variable pulley system, wherein a single-sided movable face pulley is used, and a cam arrangement is used to automatically compensate and maintain alignment as the motor housing and drive ratio is changed.

According to the present invention, a variable speed drive includes a fixed pulley mounted on a shaft adapted to impart rotary drive to a load such as a fan or the like, and a variable pulley mounted on the shaft of a drive motor. The variable pulley is of the type having one fixed face and one movable face to accommodate changes in the effective drive pitch diameter. A drive belt couples the two pulleys. The motor and variable pulley are pivotally mounted to a frame with respect to the fixed pulley so as to provide arcuate movement of the motor to vary the distance between the variable and fixed pulleys, thereby causing a change in the effective drive pitch diameter of the variable pulley and hence the drive ratio of the system. The pivot means in addition provides limited lateral movement of the motor and its variable pulley, in a direction parallel to the motor shaft. Actuator means are provided for controlling the pivotal position of the motor to thereby control the drive ratio, and this can be operated in conjunction with a conventional control system to control the drive to the fan or the like. Cam means are provided and positioned for engagement upon arcuate movement of the motor to cause a predetermined amount of lateral movement of the motor to compensate for changes in the drive line of the variable pulley caused by movement of the moveable face thereof. In this manner the variable pulley, fixed pulley and drive belt are kept in accurate alignment thoughout the entire range of pivotal movement of the motor and corresponding variation in the drive ratio of these systems.

Thus, several advantages are realized. A single-sided movable sheave pulley is less expensive and has fewer moving parts, and is more reliable than a two-side movable sheave. Further, the problem of sticking or uneven movement of the two sides in the prior art is overcome. Finally, the cam arrangement ensures accurate repeatable alignment regardless of drive ratio position for long belt life.

BRIEF DESCRIPTION OF THE DRAWING

In the drawing.

FIG. 6 is an enlarged vertical section seen from the line 6—6 of FIG. 3;

FIG. 7 is a vertical section as seen from line 7—7 of FIG. 6;

DESCRIPTION OF THE PREFERRED EMBODIMENT

Figure 1:
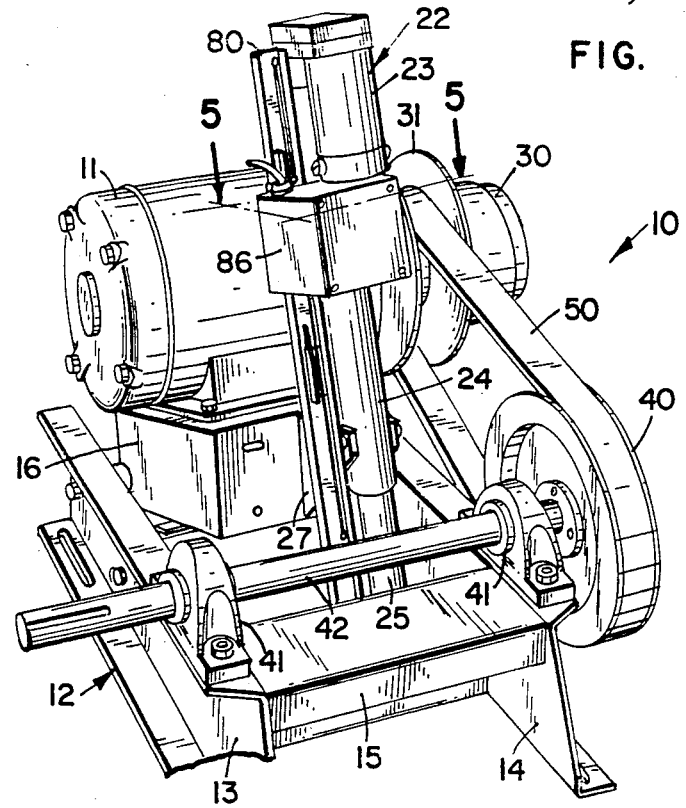
FIG. 1 is a view in perspective of a variable speed drive unit according to the present invention.

Referring now to the various figures of the drawing, in which the same parts have the same reference numbers throughout, a variable speed drive according to the present invention is generally designated by reference number 10. Major components include a motor 11, a variable pulley 30, a fixed pulley 40, and a drive belt 50. A main chassis or frame 12 is provided, and can be constructed through any suitable technique, for example, side rail members 13 and 14 and cross member 15. Bearings 41 mount to chassis 12 and support shaft 42, one end of which receives fixed pulley 40. The other end of shaft 42 is available for suitable connection to an output device, for example, to another fixed pulley system to a blower. The entire drive unit can be positioned adjacent a large blower in an air conditioning system.

Motor 11 is mounted to a motor frame 16 by suitable fastening means. Variable pulley 30 is mounted on the end of shaft 17 of motor 11. Variable pulley 30 is of a type referred to as a single side movable sheave, in that face 31 is axially movable under spring loaded pressure, while face 32 remains fixed with respect to the shaft.

Figure 2:
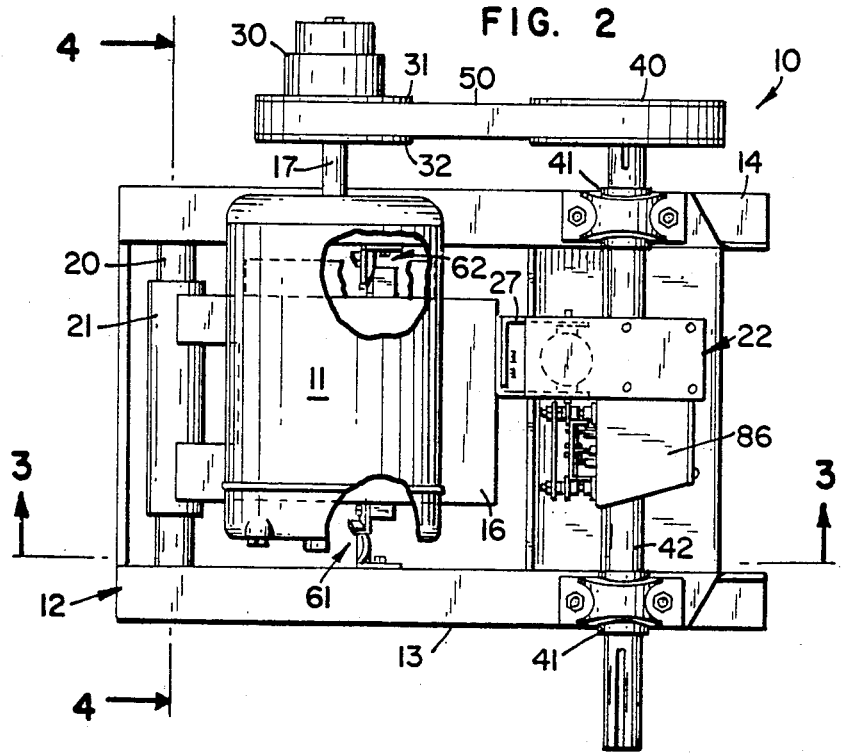
FIG. 2 is a view in top plan thereof.
Figure 3:
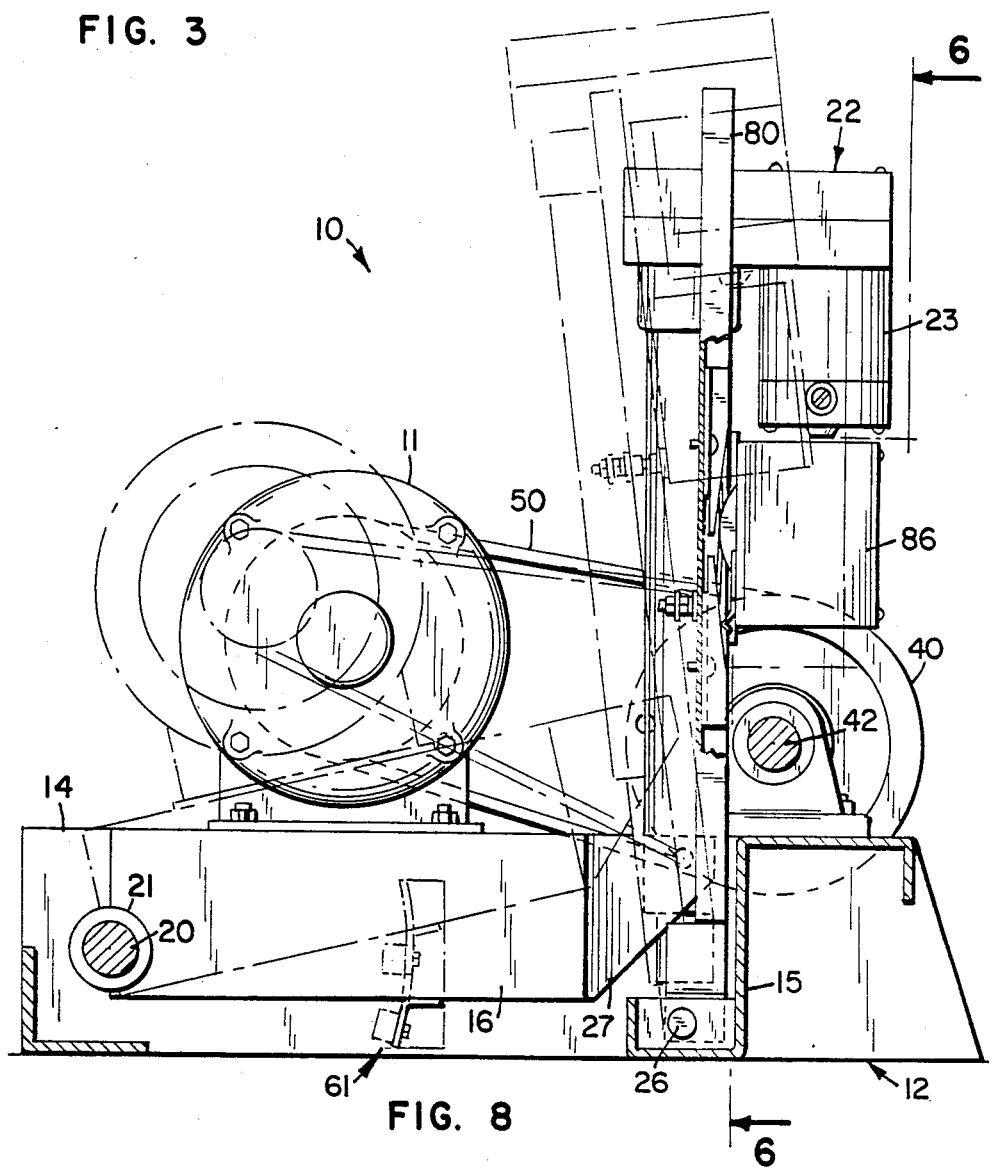
FIG. 3 is a enlarged sectional view as seen from line 3—3 of FIG. 2.

As seen particularly in FIGS. 2 and 3, motor frame 16 is pivotally mounted to chassis 12. Specifically, the pivotal connection is provided by a pivot rod 20 which extends from between side rails 13 and 14 of the chassis towards the end thereof and is secured thereto, and a sleeve member 21 which slideably fits over rod 20. Motor frame 16 in turn is secured to sleeve 21, as by welding. The pivot formed by rod 20 and sleeve 21 permits pivotal movement of the motor frame, and it also permits limited lateral movement of the motor frame in a direction parallel to the motor shaft 17.

An actuator is provided for controlling the pivotal movement of motor frame 16, motor 11 and variable pulley 30. A number of different types of actuators could be used, and in the preferred embodiment a ball screw linear actuator 22 is used. Such devices which are commercially available and generally known include an actuator motor 23, a housing which includes a sleeve portion 24, and a linearly extendable actuator rod 25. As seen for example in FIGS. 3 and 6, the actuator rod 25 is secured to the chassis cross member 15 by a pivot pin 26. This allows pivotal movement of the actuator with respect to the chassis as the motor frame is pivoted. In addition, the actuator is mounted at a small angle to accommodate the shifting of the motor as it is pivoted. The main body of actuator 22 is secured to the motor frame 16. Specifically, sleeve portion 24 is pivotally secured to a pair of projections 27 secured to motor frame 16.

In operation, linear actuator 22 causes pivotal movement of motor frame 16 about sleeve 21 when linear actuator 22 is energized. Since sleeve 21 is at the back of the motor frame 16, this causes the motor 11, and its shaft 17 and variable pulley 30 to move through an arc, thus changing the distance between the pulleys as shown in solid and broken line in FIG. 3, and changing the drive ratio in a manner as is generally known.

Figure 8:
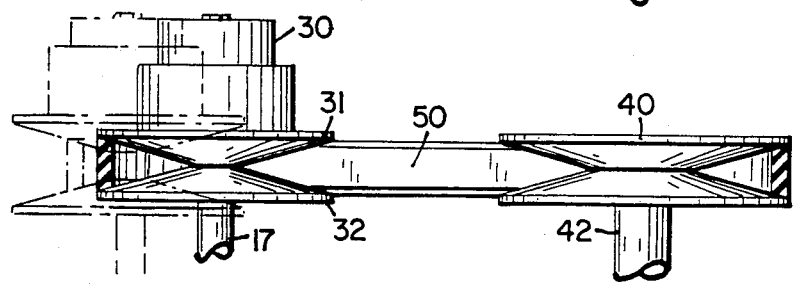
FIG. 8 is a diagrammatic view illustrating the operation of the variable pulley of the apparatus of FIG. 1.

As previously mentioned, a cam system is used in the present invention to adjust the lateral position of motor frame 16 as it pivots to change the drive ratio. This is accomplished by means of cam assemblies 61 and 62 associated with the chassis side rails 13, 14 and the motor frame 16. The reason for the lateral movement is to maintain alignment of the pulleys and belt with changes in drive ratio, as suggested in FIG. 8, in which the solid line shows the faces close together in the high speed drive position, and the broken line shows the faces farther apart in the low speed drive position. As mentioned above, prior art systems have used a double side movable face sheave, so that both faces could move by the same amount thereby maintaining drive line alignment despite changes in drive ratio. However, if the two faces would move unevenly, for example, due to wear or dirt, the drive line would be displaced, resulting in excessive wear and premature failure of the belt. In the present invention, a single movable face pulley is used, so that as movable face 31 moves in response to changes in belt tension caused by pivoting of the motor, at the same time the entire motor, shaft, and fixed face 32 move an equal amount in the opposite direction so that the net result is that the drive line centerline is maintained constant.

Figure 4:
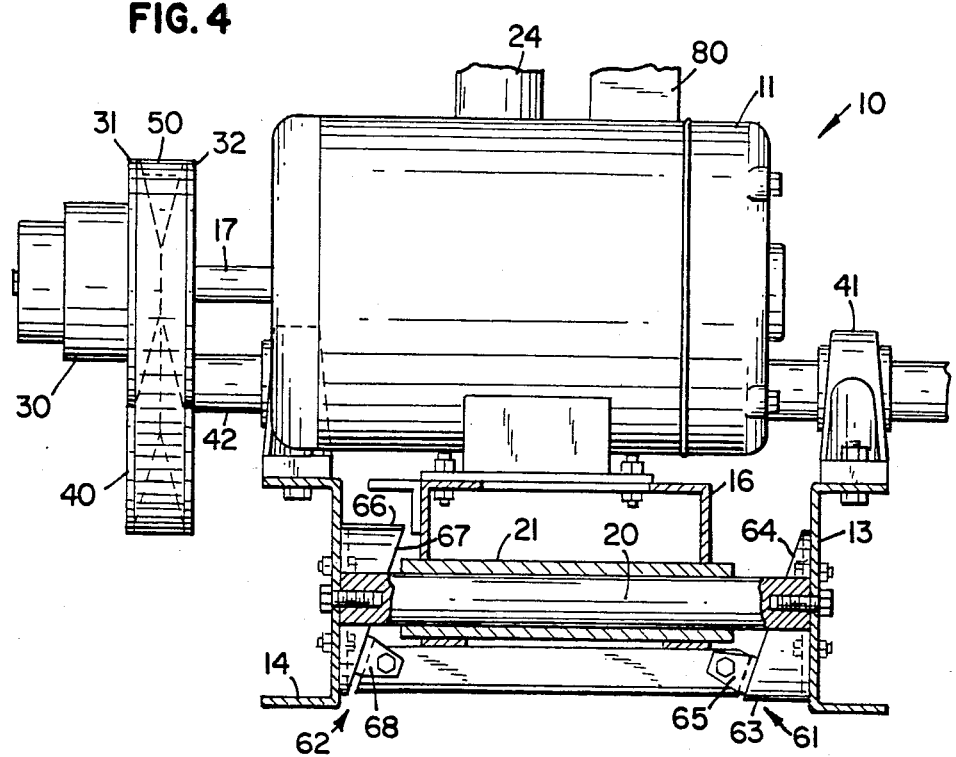
FIG. 4 is an enlarged sectional view as seen from line 4—4 of FIG. 2, portions thereof broken away.

The cams 61, 62 are not visible in FIG. 1, but are seen in the cutaway portions in FIG. 2, and also are seen in FIGS. 3 and 4. As seen in FIG. 4, cam assembly 61 includes a cam 63 having an angle or sloped cam surface 64. When seen from the rear view, the cam looks triangular in shape, and when seen from side view as in FIG. 3, it is slightly arcuate to match the arc of rotation about sleeve member 21. Cam 63 is attached to side rail 13 of the chassis. Cam follower 65 is attached to a part of motor frame 16, and positioned to engage cam surface 64.

A similar arrangement is located on the other side of the apparatus, where cam assembly 62 comprises cam 66 having sloped cam surface 67. Cam 66 is attached to side rail 14 of the chassis. A corresponding cam follower 68 is attached to a portion of motor frame 16 for engagement with cam surface 67. Cam 66 is similar to cam 63, but is of opposite sense, i.e., narrow at the bottom and wide at the top as seen in FIG. 4.

Upon rotation of the motor frame upward, to increase the distance between the pulleys and reduce the drive ratio, cam 66 and follower 68 cause the motor including its shaft and the variable pulley to move to the right as seen in FIG. 4, to compensate for changes in the spacing of the variable pulley faces, to keep the drive line in constant alignment. Upon rotation of the motor frame downward, to move the drive to a higher speed, cam 63 and follower 65 move the motor back to the left in FIG. 4 to maintain alignment. The slight lateral movements required are accommodated by the sliding of sleeve 21 on rod 20 while it pivots.

Figure 5:
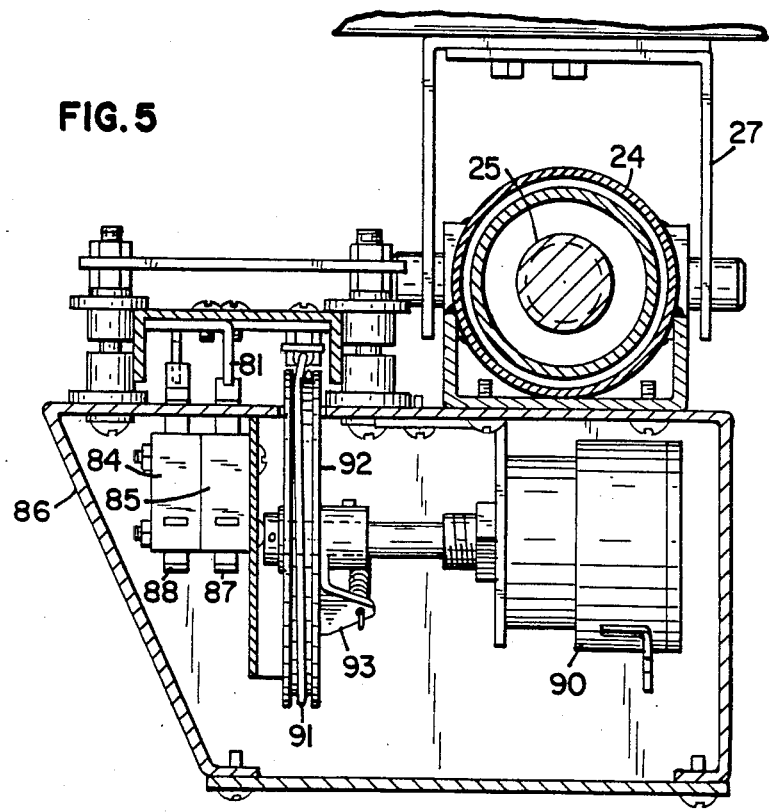
FIG. 5 is an enlarged horizontal section as seen from the line 5—5 of FIG. 1.

For use with a control system in an air conditioning system, the unit is preferably provided with a position sensing potentiometer and limit switcher for the linear actuator 22. These components are seen in FIGS. 5, 6 and 7. A generally vertical channel 80 is positioned alongside linear actuator 22. As seen in FIG. 6, channel 80 is attached by suitable bracket or other mechanical connection to pivot pin 26, so that it does not move up and down with the pivoting of the motor frame. Channel 80 includes a pair of cams which are used to actuate limit switches. Cam 81 is used to limit upward movement, and cam 82 limits downward movement. Both of these cams can comprise angle members bolted to channel 80 at an appropriate position, and both have flanged portions in a plane perpendicular to the plane of FIG. 6 which engage the limit switches.

The limit switches 84 and 85 are mounted within a housing 86 which in turn is secured to sleeve 24 of the linear actuator 22, so that housing 86 moves up and down with the actuator 22 and with the pivoting of the motor frame 16. Limit switches 84 and 85 are snap action switches with actuating levers 88 and 87, respectively, positioned to engage the aforementioned cams. Specifically, switch 84 is positioned for actuation by cam 82 and serves as the lower limit switch, while switch 85 is positioned for actuation by cam 81 and serves as the upper limit switch. An electrical cable 89 connects the limit switches and the sensing potentiometer to a control system (not shown) as generally known.

When the actuator 22 is in an intermediate position, neither of switches 84, 85 will be actuated. As the actuator 22 moves to a lower position, the actuating lever 88 of switch 84 will ride up cam 82, such as is shown in FIG. 7, until such time as the switch is actuated, which is then used to stop the actuator motor 23. When the actuator 22 moves upwardly, the actuating lever 87 for switch 85 will engage the sloped surface of cam 81 and will eventually actuate it to stop the actuator motor 23 when it reaches its upper limit of travel. Cams 81 and 82 can preferably be mounted in slots that permit adjustment of the limit switches.

A sensing potentiometer 90 is also provided, for sending electrical signals to the control system indicative of the positioning of the actuator 22, and hence indicative of the selected speed of the drive. A cable 91 is fastened in channel 80 at both ends and passes through a loop around and is fastened to a pulley wheel 92, so that pulley wheel 92 is caused to rotate as the actuator 22 moves up and down. Pulley 92 connects through a lost motion connection 93 to the shaft of potentiometer 90. Ordinarily, the potentiometer 90 runs with the pulley 92, but the lost motion connection 93 is provided to permit lowering of the actuator 22 below its lowest stop for maintenance purposes. Specifically, a manual bypass switch may be provided to bypass limit switch 84 and allow the linear actuator motor 23 to drive the unit down below the normal stop position to provide enough slack in the drive belt 50 to permit easy replacement. The lost motion connection 93 permits movement of the pulley 92 beyond the end stop position of potentiometer 90 without damaging it, for that purpose.

In normal operation a conventional control system, such as one which senses duct pressure, can be connected to drive linear actuator motor 23 to increase or decrease the drive ratio of the drive to increase or decrease fan speed and air pressure. The limit switches prevent the control system from calling for movements beyond the range of the device. Manual mode switches can also be provided to permit manual control of the drive ratio.

The present invention thus provides an improved variable speed drive, particularly useful for controlling blowers in an air conditioning system or the like. By using a single side instead of a double side movable variable pulley, savings in cost are realized, and the possibility of uneven movement of the faces and misalignment and wear of the belt is overcome. At the same time, the cams associated with pivoting of the motor frame compensate for the movement of the single movable face of the pulley, to maintain overall belt and pulley alignment for maximum belt life.

What is claimed is:

1. A variable speed drive, comprising:
   a fixed pulley mounted on a shaft adapted to impart rotary drive to a load;
   a motor;
   a variable pulley mounted on the shaft of said motor, said variable pulley of the type having one fixed face and one movable face to change the radius at which a drive belt contacts said variable pulley;
   a drive belt engaging said variable and fixed pulleys;
   pivot means pivotally mounting said motor for arcuate movement of the motor and the variable pulley to vary the distance between the variable and fixed pulleys, said pivot means permitting limited lateral movement of said motor and the variable pulley in a direction parallel to the motor shaft;
   actuator means connected for controlling the pivotal position of said motor thereby to control the spacing of the variable face and the drive ratio of the drive; and
   cam means positioned for engagement upon arcuate movement of said motor to cause lateral movement thereof in the direction parallel to the motor shaft to compensate for changes in the drive line of the variable pulley caused by movement of the movable side thereof, whereby to maintain the fixed pulley, the movable pulley and the drive belt in alignment throughout the range of variation in the drive ratio.

* * * * *